(12) United States Patent
Lee et al.

(10) Patent No.: US 7,948,700 B2
(45) Date of Patent: May 24, 2011

(54) BIT PATTERNED MEDIUM

(75) Inventors: Hoo-san Lee, Osan-si (KR); Sung-chul Lee, Osan-si (KR); Hoon-sang Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/127,390

(22) Filed: May 27, 2008

(65) Prior Publication Data

US 2009/0059429 A1 Mar. 5, 2009

(30) Foreign Application Priority Data

Aug. 29, 2007 (KR) ........................ 10-2007-0087313

(51) Int. Cl.
*G11B 5/09* (2006.01)

(52) U.S. Cl. ........................................ 360/48

(58) Field of Classification Search .................... 360/48, 360/49, 40, 71, 77.08, 77.03, 78.11, 135; 428/836
See application file for complete search history.

(56) References Cited

U.S. PATENT DOCUMENTS

| | | | | |
|---|---|---|---|---|
| 6,421,195 | B1 * | 7/2002 | Rubin et al. | 360/48 |
| 7,050,250 | B2 * | 5/2006 | Kosugi et al. | 360/49 |
| 7,067,207 | B2 * | 6/2006 | Kamata et al. | 428/836 |
| 7,452,048 | B2 * | 11/2008 | Silverbrook | 347/16 |
| 2006/0141141 | A1 * | 6/2006 | Kamata et al. | 427/128 |
| 2008/0204935 | A1 * | 8/2008 | Okino | 360/135 |
| 2009/0029298 | A1 * | 1/2009 | Lee et al. | 430/327 |
| 2009/0061259 | A1 * | 3/2009 | Lee et al. | 428/828 |

* cited by examiner

*Primary Examiner* — Fred Tzeng
(74) *Attorney, Agent, or Firm* — Sughrue Mion, PLLC

(57) ABSTRACT

Provided is a bit patterned medium including bridges which induce exchange coupling between adjacent bits in order to reduce a switching field difference resulting from different magnetization directions of bits. The bridges and the bits are integrally formed with each other. The bits are locally connected by the bridges. A magnetostatic force for each bit is reduced due to an exchange coupling between adjacent bits, thereby reducing a switching field distribution of the bits.

11 Claims, 8 Drawing Sheets

TRACK DIRECTION

BIT COERCIVE FORCE : 5000 Oe

| OCCURRENCE OF EXCHANGE COUPLING | ADDITIONAL FIELD |
|---|---|
| YES | 4000 Oe |
| NO | 3000 Oe |

BIT PATTERNED MEDIUM

CROSS-REFERENCE TO RELATED PATENT APPLICATION

This application claims priority from Korean Patent Application No. 10-2007-0087313, filed on Aug. 29, 2007, the disclosure of which is incorporated herein by reference in its entirety.

BACKGROUND OF THE INVENTION

1. Field of the Invention

The present invention relate to a perpendicular magnetic recording medium, and more particularly, to a bit patterned medium where bits, which are units of data, are isolated in the form of islands.

2. Description of the Related Art

Since hard disk drives (HDDs) using a magnetic recording medium have high capacity and high speed access, HDDs are used as storage media for various digital devices as well as computers. The capacity of magnetic recording media is determined by tracks per inch (TPI), which is track density in the rotational direction of a disk, and by bits per inch (BPI), which is bit density on tracks. One of the most popular magnetic recording media, continuous magnetic recording media where bits are not physically isolated have limitations in increasing TPI and BPI by reducing a bit size or a track pitch. This is because, when a bit size or a track pitch is reduced below a limit, noise increases due to magnetic interaction between adjacent bits and recording stability degrades drastically.

In bit patterned media where bits, which are units of data, are isolated in the form of islands, the bits are formed along tracks of a rotating disk and spaces between the patterned tracks or bits are empty or filled with a nonmagnetic material. Since there is no interaction between adjacent bits, the bit patterned media can achieve high recording density.

However, one requirement for bit patterned media applications is the minimization of a switching field distribution of bits. Factors affecting the switching field of each bit include the dimension and magnetic characteristics of each bit, and the magnetization directions of neighboring bits. The dimensions and magnetic characteristics of bits may be uniform. A difference between the dimensions or magnetic characteristics of bits can be kept within allowable ranges by controlling manufacturing processes. However, a switching field difference due to magnetostatic interaction between adjacent bits cannot be reduced by controlling manufacturing processes. In order to reduce a switching field difference, it is necessary to reduce a bit size or a saturation magnetization ($M_S$). However, in such a case, output is reduced, thereby causing another problem.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a bit patterned medium that can reduce a switching field difference between bits due to a magnetostatic force.

The present invention also provides a bit patterned medium that can increase the stability of adjacent bits which are not recorded in a write mode by reducing a switching field difference.

According to an aspect of the present invention, there is provided a bit patterned medium comprising a magnetic recording layer, wherein the magnetic recording layer comprises: a plurality of bits which are units of data; and bridges connecting the bits.

The bridges may be integrally formed with the bits. The bridges may induce exchange coupling between adjacent bits, and an exchange coupling force may be strong enough to reduce or offset a magnetostatic force for each bit. The bridges may have an average width less than the width of the bits.

The magnetic recording layer may be formed of any one selected from the group consisting of a Co alloy, such as CoCrPtB, CoCrPt, or CoPt, and an alloy having an $L1_0$ ordered phase, such as CoPt or FePt.

In order to reduce or offset a magnetostatic force from adjacent bits using exchange coupling, the bridges may have an exchange coupling constant of 0.001 e-6 erg/cm$^2$ to 1 e-6 erg/cm$^2$, and may preferably have an exchange coupling constant of 0.01 e-6 erg/cm$^2$ to 0.1 e-6 erg/cm$^2$.

The bit patterned medium may further comprise: a substrate on which the magnetic recording layer is formed; a soft magnetic underlayer disposed between the magnetic recording layer and the substrate; and an intermediate layer disposed between the magnetic recording layer and the soft magnetic underlayer.

The magnetic recording layer may comprise a plurality of non-magnetic regions, wherein the bridges connecting the bits are disposed between the non-magnetic regions. The non-magnetic regions may be filled with a non-magnetic material.

The bridges induce exchange coupling between the bits and the exchange coupling force of the bridges is applied in a direction opposite to that of a mangetostatic force. Accordingly, the exchange coupling force between adjacent bits reduces or offsets the magnetostatic force from the adjacent bits, reducing a switching field difference of the bits, reducing a noise field for the adjacent bits in a write mode, and increasing the recording stability of the adjacent bits.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
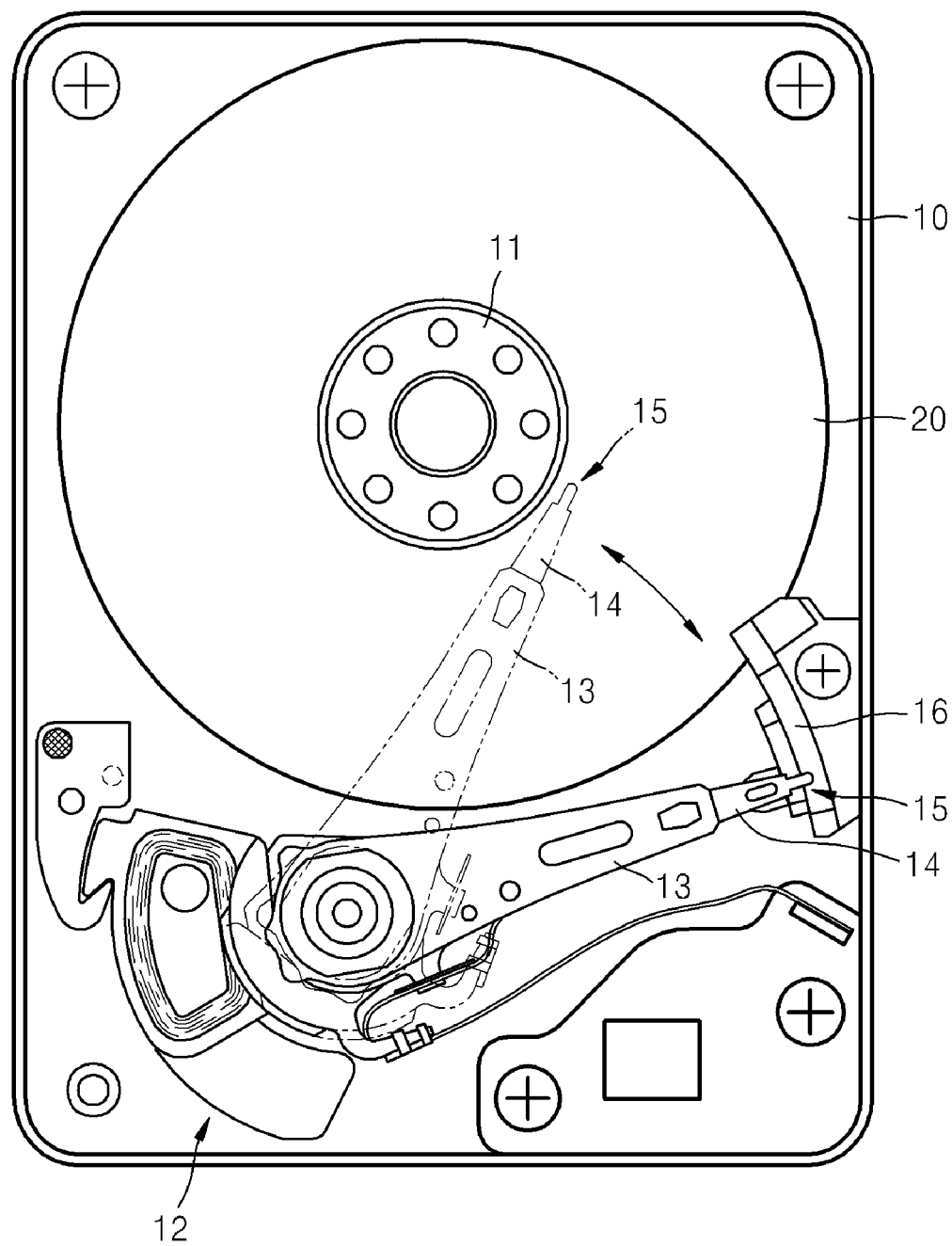
FIG. 1 is a plan view of an HDD to which a bit patterned medium, e.g., a disk, is applied according to an exemplary embodiment of the present invention.

The invention is described more fully hereinafter with reference to the accompanying drawings, in which exemplary embodiments of the invention are shown. This should not be construed as limiting the claims to the exemplary embodiments shown. Rather, these exemplary embodiments are provided to convey the scope of the invention to those skilled in the art. In the drawings, the size and relative sizes of elements and regions may be exaggerated for clarity.

It will be understood that when an element or layer is referred to as being "on", "disposed", "disposed", or "between" another element or layer, it can be directly on, disposed, disposed, or between the other element or layer or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one exemplary embodiment", "another exemplary embodiment", "an exemplary embodiment", and so forth, means that a particular element (e.g., feature, structure, and/or characteristic) described in connection with the exemplary embodiment is included in at least one exemplary embodiment described herein, and may or may not be present in other exemplary embodiments. In addition, it is to be understood that the described elements may be combined in any suitable manner in the various exemplary embodiments.

The endpoints of all ranges directed to the same component or property are inclusive of the endpoint and independently combinable, e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc. The modifier "about" used in connection with a quantity is inclusive of the stated value and has the meaning dictated by the context (e.g., includes the degree of error associated with measurement of the particular quantity).

Unless defined otherwise, technical and scientific terms used herein have the same meaning as is commonly understood by one of skill in the art to which this invention belongs.

FIG. 1 is a plan view of an HDD to which a bit patterned medium is applied according to an exemplary embodiment of the present invention.

Referring to FIG. 1, a disk-shaped bit patterned medium 20, e.g., a disk, is mounted on a spindle motor 11 that is installed on a side of a base 10. A magnetic head 15 is fixed to a bottom surface of a front end of a suspension assembly 14 coupled to an actuator arm 13. The magnetic head 15 is installed to reciprocate in a radial direction of the disk from a radially inner line to a radially outer line according to the operation of the actuator arm 13, and fly at a predetermined height above a surface of the bit patterned medium 20 that is rotating at high speed. The magnetic head 15 is lifted due to an air bearing generated between the magnetic head 15 and the bit patterned medium 20. A voice coil motor 12 installed at a side of the actuator arm 13 provides a force which moves the actuator arm 13. Reference numeral 16 denotes a ramp on which the magnetic head 15 is parked.

Figure 2:
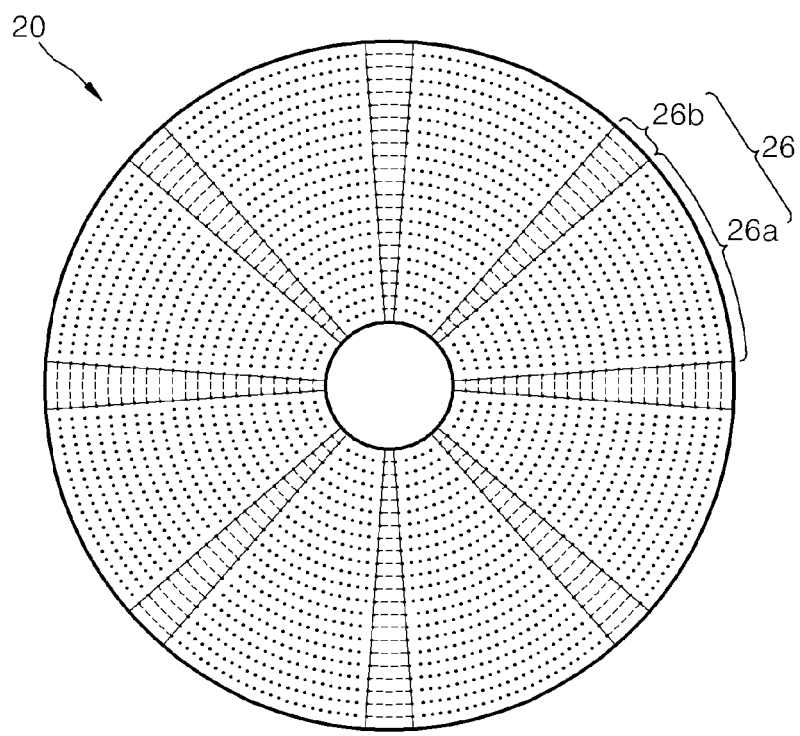
FIG. 2 is a plan view of the bit patterned medium of FIG. 1.

FIG. 2 is a plan view of the disk 20 of FIG. 1. Referring to FIG. 2, the bit patterned medium 20 includes a disk-shaped substrate 21 and a magnetic recording layer 22 formed on at least one surface of the substrate 21. The magnetic recording layer 22 includes a plurality of sectors 26, which are disposed at regular intervals about the center of the bit patterned medium 20. Each of the sectors 26 includes a data region 26a and a servo region 26b.

Figure 3A:
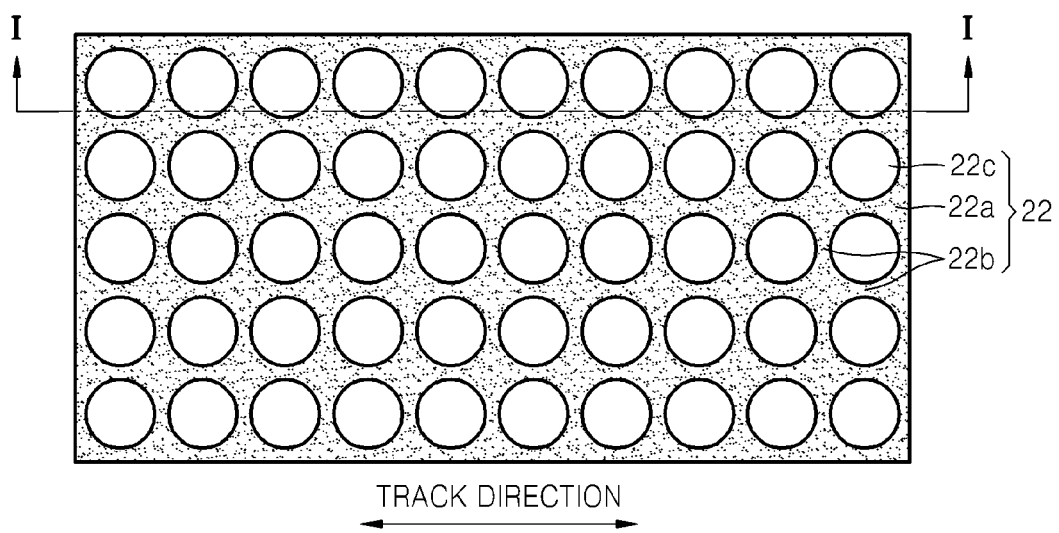
FIG. 3A is a perspective view of a part of a bit patterned medium according to an exemplary embodiment of the present invention.
Figure 3B:
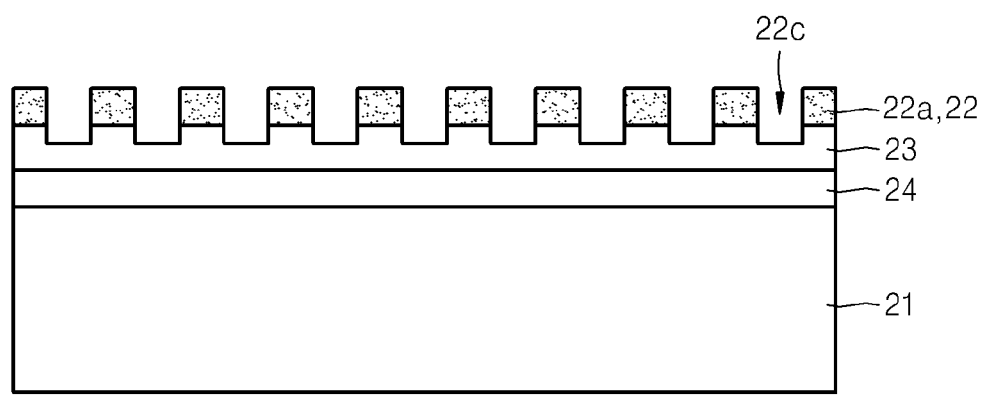
FIG. 3B is a cross-sectional view taken along line I-I of FIG. 3A.

FIG. 3A is a perspective view of a data region of a bit patterned medium 20 according to an exemplary embodiment of the present invention. FIG. 3B is a cross-sectional view taken along line I-I of FIG. 3A.

Referring to FIG. 3A, circular non-magnetic regions 22c are arranged at regular intervals on a magnetic recording layer 22, such that bits 22a, which are magnetically recorded, are connected by bridges 22b. The bits 22 and the bridges 22b are obtained from one material layer. The non-magnetic regions 22c have a diameter (or a width) of several to tens of nanometers (nm). The bridges may preferably have a width less than that of the bits 22a. The bridges 22b induce exchange coupling between adjacent bits 22a. An exchange coupling force can be adjusted by varying the thickness and width (average width) of the bridges 22b. The exchange coupling force should be strong enough to reduce or offset a magnetostatic force applied to each of the bits 22a. The bits 22a and the bridges 22b may be formed by nanoimprinting. When the bits 22a and the bridges 22b are obtained from one magnetic material layer, the bits 22a and the bridges 22b may have the same height and the bridges 22b may have a width less than that of the bits 22a. In this case, the exchange coupling force can be adjusted by varying the width of the bridges 22b. Alternatively, the bridges 22b and the bits 22a may be stacked and formed of different materials. However, the bridges 22b and the bits 22a may preferably be formed of the same material. Although it may be preferable that the bridges 22b are formed of the same material as that of the bits 22a, the bridges 22b may be formed of any material that can induce exchange coupling between adjacent bits.

Referring to FIG. 3B, the non-magnetic regions 22c are disposed between the bits 22a of the magnetic recording layer 22, and an intermediate layer 23 formed of a non-magnetic material and a soft magnetic underlayer 24 formed of a soft magnetic material are disposed under the magnetic material layer 22. The soft magnetic underlayer 24, the intermediate layer 23, and the magnetic material layer 22 are sequentially stacked on a non-magnetic substrate 21.

The non-magnetic regions 22c may have a circular shape as shown in FIGS. 3a and 3B. Alternatively, the non-magnetic regions 22c may have a quadrangular or polygonal shape. The non-magnetic regions 22c are not limited to a specific shape. The non-magnetic regions 22c may be empty or filled with a non-magnetic material.

The magnetic recording layer 22 including the bits 22a and the bridges 22b may be formed of a Co alloy, such as CoCrPtB, CoCrPt, or CoPt, or an alloy having an $L1_0$ ordered phase, such as CoPt or FePt.

The soft magnetic underlayer 24 may be any one of a CoZrNb layer, a CoFeZrNb layer, a NiFe layer, a NiFeMo layer, and a CoFeNi layer. The soft magnetic underlayer 24 may have a thickness of 5 to 300 nm. The intermediate layer 23 is formed of a non-magnetic material and adapted to improve the orientation characteristics of the magnetic recording layer 22 formed over the intermediate layer 23. For example, the intermediate layer 23 may be formed of any one selected from the group consisting of Ti, Ru, Pt, Cu, Au, RuCr, and MgO. The intermediate layer 23 may have a thickness ranging from several to tens of nanometers (nm).

Figure 4A:
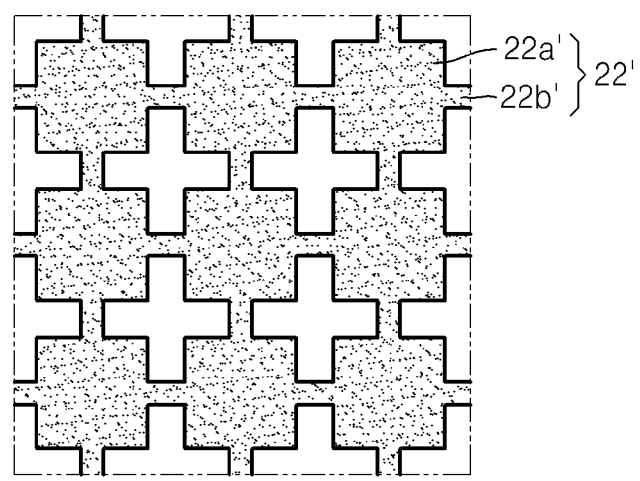
FIGS. 4A, 4B, and 4C illustrate modifications of a magnetic recording layer of the bit patterned medium of FIG. 3A.
Figure 4B:
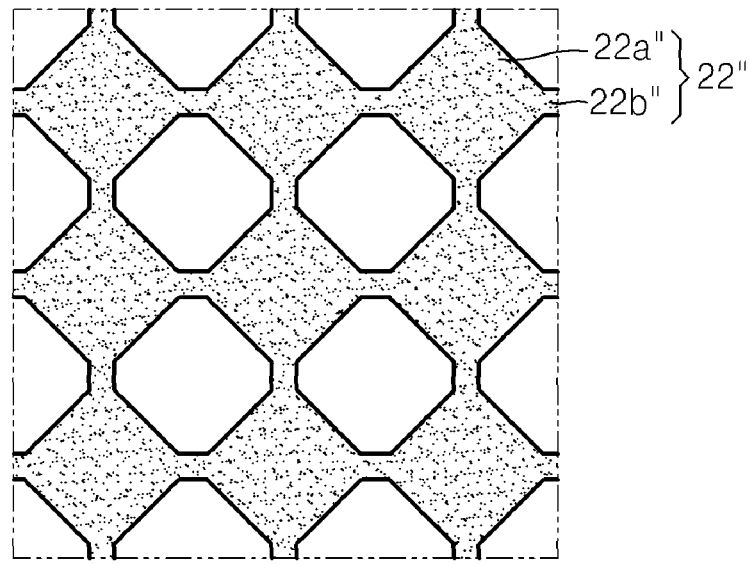
Figure 4C:
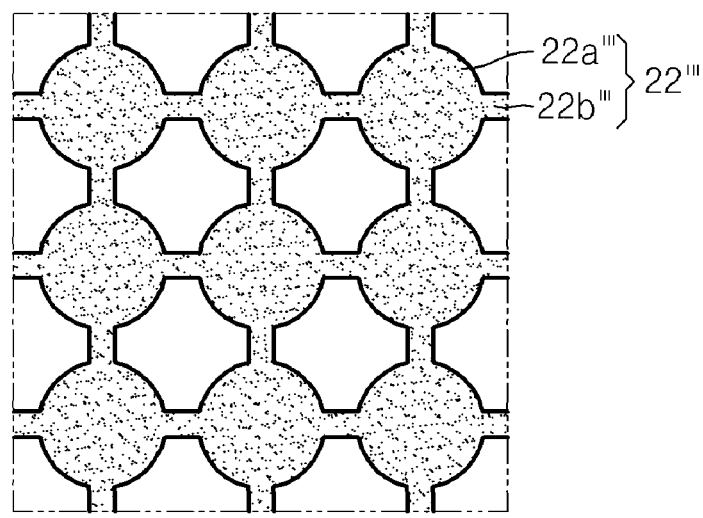

FIGS. 4A, 4B, and 4C illustrate modifications of the magnetic recording layer 22 of FIG. 3A. In FIGS. 4A, 4B, and 4C, 22', 22", and 22'" denote magnetic recording layers, 22a', 22a", and 22a'" denote bits, and 22b', 22b", and 22b'" denote bridges.

Referring to FIG. 4A, the bits 22a' have a quadrangular shape, and the bridges 22b' connect the centers of sides of the bits 22a'. The bits 22a' may have a rectangular or square shape.

Referring to FIG. 4B, the bits 22A" have a regular diamond shape, and the bridges 22b" connect apexes of the bits 22a.

Referring to FIG. 4C, the bits 22a'" have a circular shape, and the bridges 22b'" are located on straight lines crossing the centers of the bits 22a'". The bits 22a'" may have an elliptical shape instead of the circular shape.

Although three modifications of the magnetic recording layer 22 of FIG. 3A are shown in FIGS. 4A, 4B, and 4C, various other modifications can be made without departing from the scope of the present invention.

Simulation conditions under which a bit patterned medium, e.g., a disk, was tested and simulation results obtained under the simulation conditions according to an exemplary embodiment of the present invention will now be explained.

Figure 5:
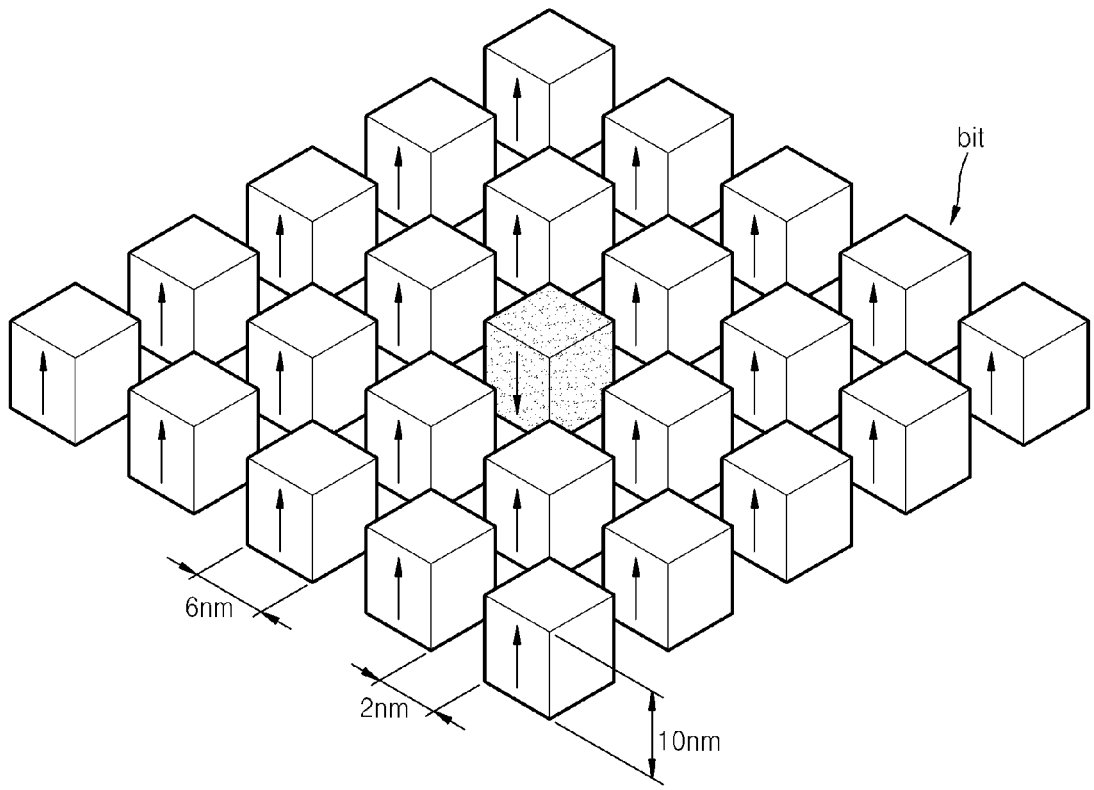
FIG. 5 is a perspective view illustrating simulation conditions under which a bit patterned medium, e.g., a disk, was tested according to an exemplary embodiment of the present invention.

A related art bit patterned medium is structured such that bits, which are units of data, are completely isolated from other bits. There is no exchange coupling between the physically isolated bits that are affected by only a magnetostatic force. In the bit patterned medium, switching fields of the bits should be uniform as described above. There are many factors that would affect the switching fields. Simulations showed that an exchange coupling layer inducing exchange coupling between bits can reduce a switching field difference. In the simulations, in order to verify a reduction in a switching field difference, a magnetostatic force arising from magnetic fields generated by neighboring bits was obtained while other factors were fixed. FIG. 5 is a perspective view illustrating simulation conditions under which a bit patterned medium was tested according to an exemplary embodiment of the present invention. Referring to FIG. 5, the length, width, and height of each bit were respectively 6 nm, 6 nm, and 10 nm, and total bits were 99×99 in horizontal and vertical directions. A damping constant was 0.25, a time step was 1 pico-second (ps), and the saturation magnetization Ms of a magnetic material was set to 100, 200, 300, and 400. An exchange coupling constant A* was 0.03 e-6 erg/cm$^2$, and a magnetic anisotropy constant Ku was 3.0 e6 erg/cc.

Figure 6:
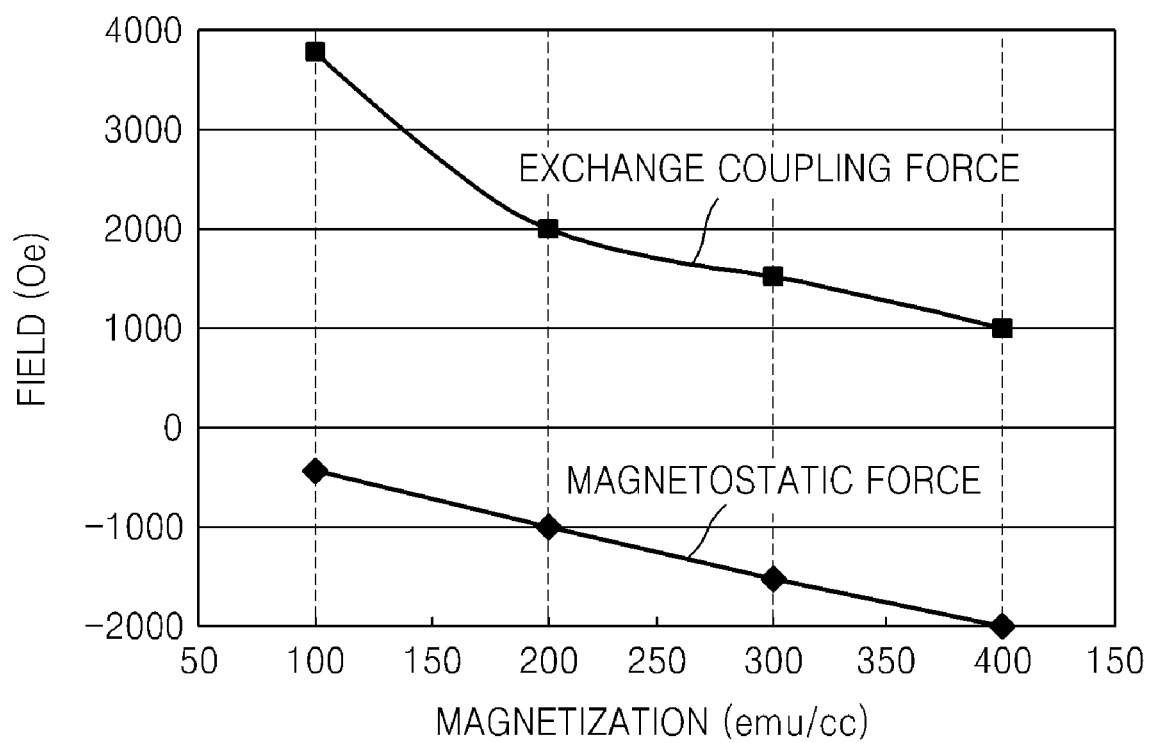
FIG. 6 is a graph of simulation results obtained under the simulation conditions of FIG. 5, illustrating magnetostatic and exchange coupling forces corresponding to four saturation magnetization values.

FIG. 6 illustrates simulation results obtained under the simulation conditions of FIG. 5. Referring to FIG. 6, when a saturation magnetization Ms was 400 emu/cc, a magnetostatic force arising from neighboring bits was approximately 2000 Oe. When a specific bit was magnetized in the same direction as that of the neighboring bits, the magnetostatic force obstructed the magnetization. When the specific bit was magnetized in a direction opposite to that of the neighboring bits, the magnetostatic force helped the magnetization. Accordingly, in both cases, a switching difference was 4000 Oe. When there was exchange coupling between adjacent bits, an exchange coupling force was 3800, 2000, 1500, and 1100 Oe according to a saturation magnetization Ms. The exchange coupling force was inversely proportional to the saturation magnetization Ms, and offsets the magnetostatic force during magnetization. For example, when a saturation magnetization Ms was 400, a magnetostatic force was approximately 2000 Oe, and when an exchange coupling constant was 0.03 e-6 erg/cm$^2$ at this time, an exchange coupling force was approximately 1000 Oe, and thus a switching field difference was approximately 2000 Oe.

Since such a low switching field difference can vary depending on the degree of exchange coupling between bits by the exchange coupling layer, a desired switching field difference can be obtained by selecting an appropriate exchange coupling constant. That is, when there is exchange coupling between adjacent bits according to the present invention, an exchange coupling force and a magnetostatic force offset, thereby reducing a switching field difference resulting from different magnetization directions of neighboring bits.

Figure 7A:
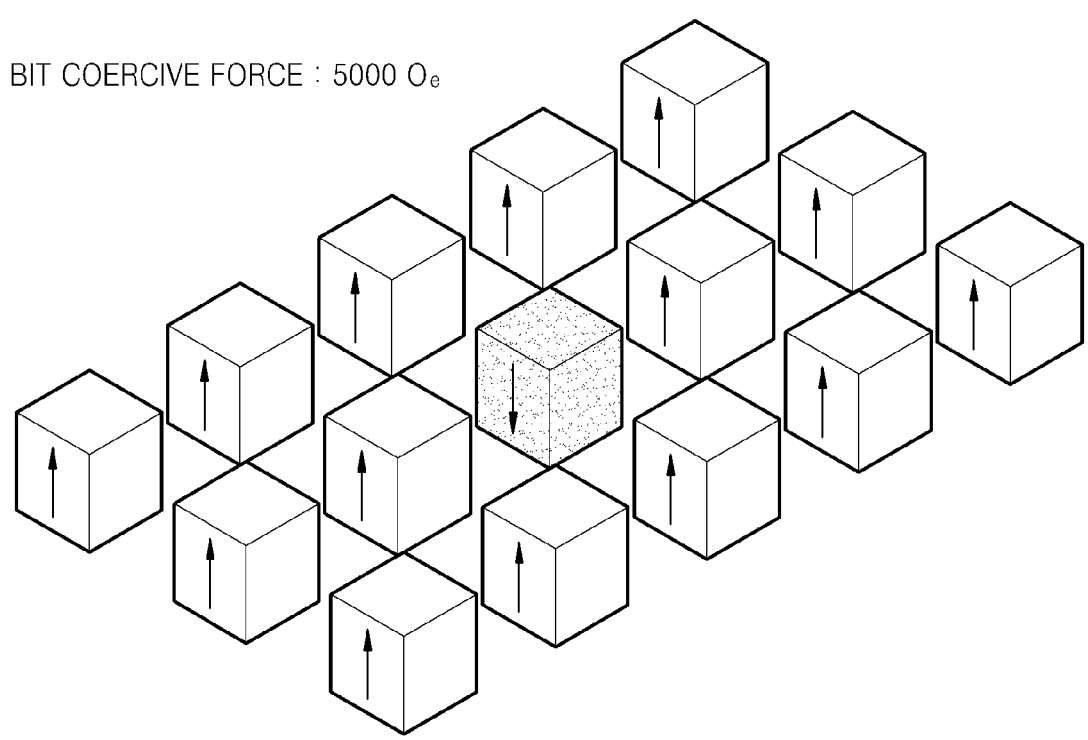
FIGS. 7A and 7B are perspective views illustrating switching fields respectively when a specific bit is recorded in a direction opposite to that of neighboring bits and when a specific bit is recorded in the same direction as that of neighboring bits.
Figure 7B:
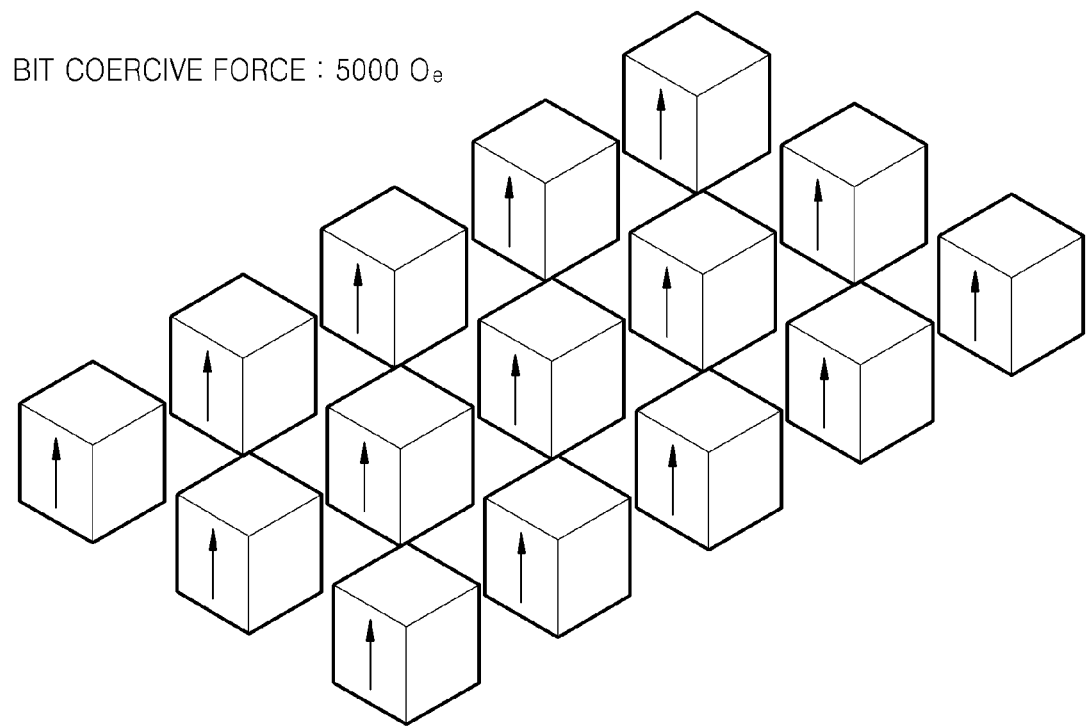

FIGS. 7A and 7B are perspective views illustrating switching fields respectively when a specific bit is recorded in a direction opposite to that of neighboring bits and when a specific bit is recorded in the same direction as that of neighboring bits.

In both cases, it is assumed that the saturation magnetization Ms of a magnetic recording layer is 400 emu/cc. As described above with reference to the simulation results, when a saturation magnetization Ms is 400 emu/cc, a magnetostatic force is approximately 2000 Oe, and when it is assumed at this time that an exchange coupling constant is 0.03 e-6 erg/cc, an exchange coupling force is 1000 Oe.

Referring to FIG. 7A, when a bit which is to be recorded, that is, a bit at the center of the figure, is recorded in a direction different from that of neighboring bits and there is exchange coupling, a switching field is 4000 Oe, whereas when a bit to be recorded is recorded in a direction different from that of neighboring bits and there is no exchange coupling, a switching field is 3000 Oe. In detail, when a specific bit to be recorded is recorded in a direction opposite to that of neighboring bits, since a magnetostatic force of approximately 2000 Oe in the same direction as the direction of the neighboring bits is already applied to the specific bit to be recorded, an additional field necessary for recording is 3000 Oe. However, when there is an exchange coupling force, since a field of 1000 Oe in the opposite direction to the direction of the neighboring bits is additionally applied, an additional field is 4000 Oe.

Referring to FIG. 7B, when a bit which is to be recorded, that is, a bit at the center of the figure, is recorded in the same direction as that of neighboring bits and there is exchange coupling, a switching field is 6000 Oe, whereas when a bit to be recorded is recorded in the same direction as that of neighboring bits and there is no exchange coupling, a switching field is 7000 Oe. In detail, when a specific bit to be recorded is recorded in the same direction as that of neighboring bits, since a magnetostatic force of 2000 Oe in the opposite direction to that of the neighboring bits is already applied to the specific bit to be recorded, an additional field necessary for recording is 7000 Oe. However, when there is an exchange coupling force, since a field of 1000 Oe in the same direction as that of the neighboring bits is additionally applied, an additional field is 6000 Oe.

That is, when there is no exchange coupling, a switching field difference is 4000 Oe. However, when there is exchange coupling between bits according to the present invention, a switching field difference is 2000 Oe, which can be controlled by varying a saturation magnetization Ms and an exchange coupling constant A*.

Considering existing various magnetic recording materials, the exchange coupling constant of the exchange coupling layer between bits ranges from 0.001 e-6 erg/cm$^2$ to 1 e-6 erg/cm$^2$, and may preferably range from 0.01 e-6 erg/cm$^2$ to 0.1 e-6 erg/cm$^2$, thereby effectively reducing a switching field difference.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bit patterned medium comprising a magnetic recording layer, wherein the magnetic recording layer comprises:
   a plurality of bits which are units of data; and
   a plurality of bridges connecting the plurality of bits,
   wherein the plurality of bits and the plurality of bridges are composed of a same magnetic material.

2. The bit patterned medium of claim 1, wherein the plurality of bridges are integrally formed with the plurality of bits.

3. The bit patterned medium of claim 1, wherein the magnetic recording layer is formed of any one selected from the group consisting of a Co alloy and an alloy having an L1$_0$ ordered phase.

4. The bit patterned medium of claim 3, wherein the Co alloy comprises one of CoCrPtB, CoCrPt and CoPt.

5. The bit patterned medium of claim 3, wherein the alloy having an L1$_0$ ordered phase comprises one of CoPt and FePt.

6. The bit patterned medium of claim 1, further comprising:
   a substrate on which the magnetic recording layer is formed;
   a magnetic underlayer disposed between the magnetic recording layer and the substrate; and
   an intermediate layer interposed between the magnetic recording layer and the soft magnetic underlayer.

7. The bit patterned medium of claim 6, wherein the magnetic recording layer comprises a plurality of non-magnetic regions, wherein the plurality of bridges connecting the plurality of bits are interposed between the plurality of non-magnetic regions.

8. The bit patterned medium of claim 7, wherein the plurality of non-magnetic regions are filled with a non-magnetic material.

9. A bit patterned medium comprising a magnetic recording layer, wherein the magnetic recording layer comprises:
   a plurality of bits which are units of data; and
   a plurality of bridges connecting the plurality of bits,
   wherein the plurality of bridges induce an exchange coupling between adjacent bits of the plurality of bits, and an exchange coupling force reduces or offsets a magnetostatic force for each of the plurality of bits.

10. The bit patterned medium of claim 9, wherein the plurality of bridges have an average width which is less than a width of the plurality of bits.

11. The bit patterned medium of claim 9, wherein the plurality of bridges have an exchange coupling constant of 0.001 e-6 erg/cm$^2$ to 1 e-6 erg/cm$^2$.

* * * * *